May 4, 1965   H. W. ENGELMAN   3,182,182
RATIO COMPUTER
Filed Oct. 28, 1959
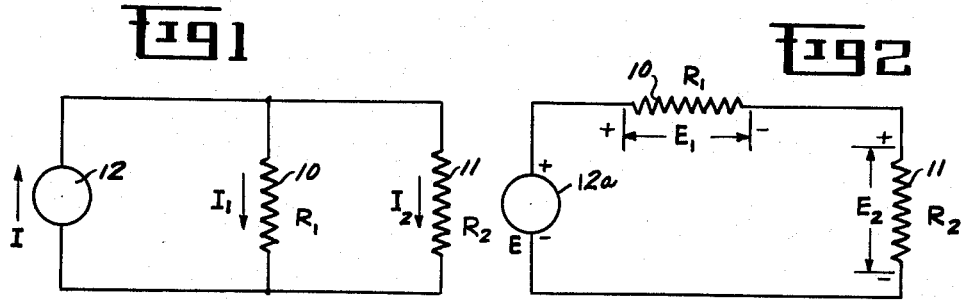
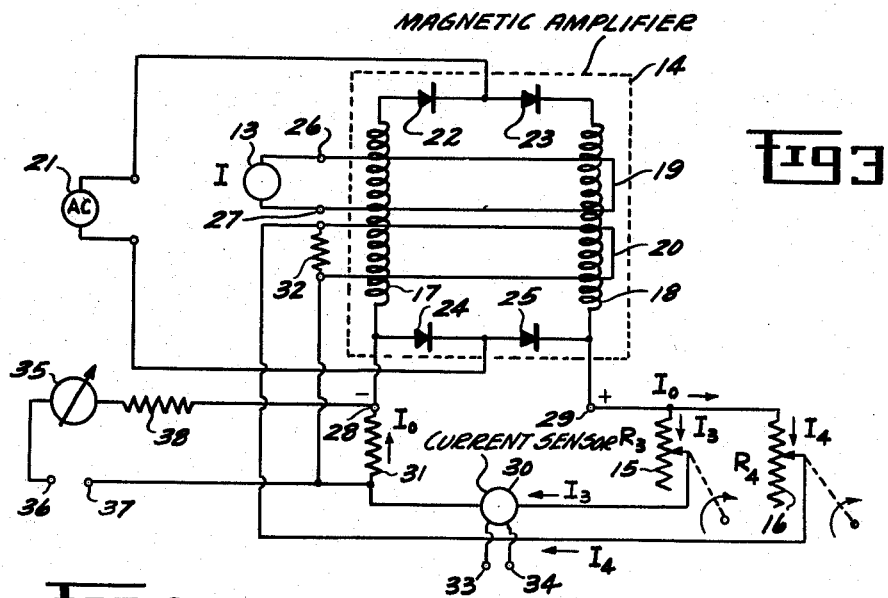
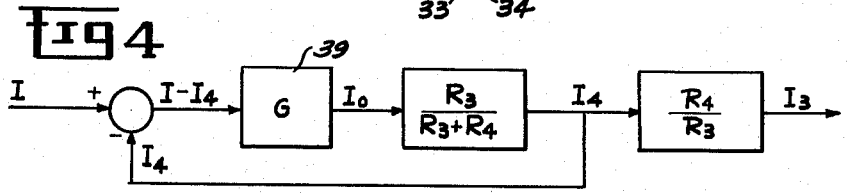
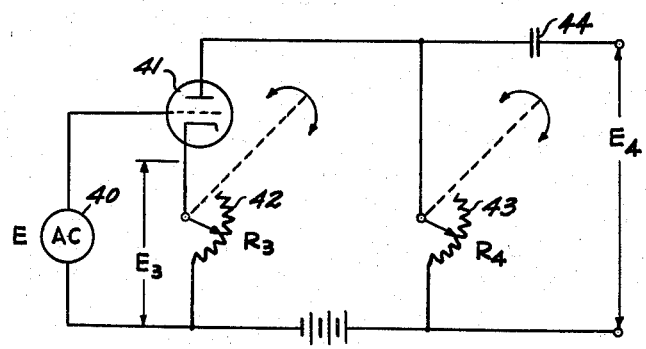
INVENTOR.
HELMUTH W. ENGELMAN
BY
Lawrence H. Norris
ATTORNEY—

United States Patent Office 3,182,182
Patented May 4, 1965

3,182,182
RATIO COMPUTER
Helmuth W. Engelman, Cincinnati, Ohio, assignor to General Electric Company, a corporation of New York
Filed Oct. 28, 1959, Ser. No. 849,303
3 Claims. (Cl. 235—196)

My invention relates to dividers or ratio computers of the type in which an output is produced which is proportional either to the quotient or ratio of two input variables or to the reciprocal of a single variable where one of the inputs is held constant.

My invention relates in particular to a ratio computer of the type wherein the ratio, product or other function of a pair of input variables is to be determined by the computation of the ratio of the resistance values of a pair of electrical resistors. It will be appreciated by those skilled in the art that a pair of electrical resistors connected either in parallel with each other to a current source or in series with each other to a voltage source exhibits, by reason of the nature of the current division between the resistors in the parallel connected case, or the voltage division between the resistors in the series connected case, a characteristic which allows the ratio of the two resistance values to be determined by measuring the current through or the voltage across one of the resistors. However, the measured current for the parallel connected case, or voltage for the series connected case, is proportional not only to the ratio of the two resistance values but also the magnitude of the current in or voltage across the other resistor so that the relationship between the measured signal and the resistance ratio is a nonlinear one. For example, in the case of two resistors connected in parallel to a current source, the current through one of the resistors is proportional not only to the ratio of the two resistance values but also to the current flowing in the other resistor, which is itself a function of the resistance ratio. Similarly, in the case of two resistors connected in series to a voltage source, the voltage across one of the resistors is proportional to both the resistance ratio and the voltage across the other resistor. In other words the multiplying factor or so-called "proportionality constant" varies as the ratio to be measured varies. Thus, for a ratio computer which requires a substantially linear relationship between the output signal and the ratio of the inputs, the ratio characteristic just described can be considered a useful one only for a very narrow range because the error increases as a function of the range of input ratios to be accommodated.

It is accordingly an object of my invention to provide an improved ratio computer of the type utilizing the above-described current or voltage division characteristic of a pair of electrical resistors connected either to a voltage or to a current source, but in which the relationship between the output signal and the ratio of the resistance values is substantially linear over a relatively wide range of input resistance ratios.

Briefly described, I accomplish this and other objects of my invention, in one embodiment thereof, by providing a pair of resistors connected either in parallel or in series with each other and to a source of electrical energy through an amplifier. The input variables whose ratio is to be computed are introduced into the system as the ohmic values of the two resistors. In the case of the parallel connected combination, a current source is employed and the current through one of the resistors, or a signal proportional thereto, is selected as the output of the system and a signal proportional to the current through the other resistor is fed back around the amplifier to the input thereof through a negative feedback loop. Similarly, where the voltage division characteristic of the series connected combination is employed, a signal proportional to the voltage across one of the resistors is selected as the output of the system and a signal proportional to the voltage across the other resistor is fed back around the amplifier through a negative feedback loop, the source in this case being a voltage source. As will later be explained, the provision of the amplifier and the negative feedback loop as just described greatly reduces the sensitivity of the system to changes in the resistance ratio and thus provides a substantially linear relationship between the output signal and the input resistance ratio over a wide range of input resistance ratios.

My invention will be better understood and other objects and advantages thereof will become apparent from the following description taken in connection with the accompanying drawings, in which:

FIG. 1 shows a pair of electrical resistors connected in parallel to a current source to illustrate the current division characteristics of such an arrangement;

FIG. 2 shows a pair of electrical resistors connected in series to a voltage source to illustrate the voltage division characteristics of this type of arrangement;

FIG. 3 is a circuit diagram of a ratio computer embodying my invention and utilizing the current division characteristics of a pair of parallel connected resistors;

FIG. 4 is a block diagram of the ratio computer shown in FIG. 3; and

FIG. 5 is a circuit diagram of a ratio computer illustrating another embodiment of my invention in which the voltage division characteristics of a pair of series connected resistors are employed.

Referring now to FIG. 1, there is shown a pair of electrical resistors 10 and 11, having electrical resistance values of $R_1$ and $R_2$ respectively, connected in parallel to a current source 12 having a constant current output of magnitude I. The current flowing through resistor 11 is of magnitude $I_2$.

Since the voltage drops across the two resistors must be equal, the product $I_1R_1$, which is the voltage drop across the resistor 10, must equal the product $I_2R_2$, the voltage drop across resistor 11. Expressing this mathematically, $$I_1R_1 = I_2R_2$$

and therefore $$I_1 = I_2 \frac{R_2}{R_1}$$

Thus, it will be observed that the current $I_1$, which for purposes of example has been chosen as the current to be measured, is proportional to the resistance ratio $R_2/R_1$. It will be further observed, however, that the current $I_1$ is also proportional to the current $I_2$. Now it can be shown mathematically that $$I_2 = I \frac{R_1}{R_1 + R_2}$$

so that $$I_1 = I \frac{R_1}{R_1 + R_2} \frac{R_2}{R_1}$$

Thus, it will be seen that the current $I_1$ is proportional both to the resistance ratio $R_2/R_1$ and to the factor $$I = \frac{R_1}{R_1 + R_2}$$

Since total current I is constant, it does not affect the linearity of the relationship between the current $I_1$ and the resistance ratio $R_2/R_1$. However, since the factor $$\frac{R_1}{R_1 + R_2}$$

varies with the resistance ratio $R_2/R_1$, the current $I_1$ is not directly proportional to the ratio $R_2/R_1$ but rather occupies a non-linear relationship to this ratio. Thus, if the circuit shown in FIG. 1 were to be used as a ratio computer with the current $I_1$ being the output and representing the ratio $R_2/R_1$, the system is useful as a linear device only over the very narrow range of the ratio $R_2/R_1$ wherein the accompanying variations in the factor $$\frac{R_1}{R_1+R_2}$$

do not introduce a greater than acceptable error. A similar analysis can be applied to the circuit of FIG. 2, wherein the resistors 10 and 11 are connected to a voltage source 12a, to show that the voltages $E_1$ and $E_2$ are each a function of both the resistance ratio and the voltage appearing across the other resistor.

Referring now to FIG. 3, I provide a ratio computer, in which the above-described characteristic is employed, but in which the relationship between the output current and the input resistance ratio is substantially linear over a relatively wide range of input ratios. In the arrangement of FIG. 3, I provide a current source 13, having a substantially constant output current of magnitude I, connected through a magnetic amplifier 14 to a pair of adjustable, parallel connected resistors 15 and 16 having ohmic resistance values $R_3$ and $R_4$ respectively and representing the input variables whose ratio is to be computed.

The magnetic amplifier itself may be conventional in form and includes a pair of gate windings 17 and 18, an input signal winding 19 and a feedback winding 20. The amplifier 14 is excited from a source of alternating current 21 connected to the gate windings 17 and 18 in a conventional manner through diodes 22, 23, 24 and 25. The current source 13 is connected directly to the input signal winding 19 through input terminals 26 and 27. The output signal from the amplifier appears at output terminals 28 and 29 in the form of an output current of magnitude $I_0$.

The amplifier output current $I_0$ divides into currents of magnitudes $I_3$ and $I_4$ flowing through resistors 15 and 16 respectively. The current $I_3$ flows through resistor 15 and then through a current measuring device 30 and a series connected resistor 31 back to the output terminal 28. The fonction of the resistor 31 will be explained later. The resistor 16 is connected in series with the feedback winding 20 and the resistor 31 so that the current $I_4$ flows through the resistor 16, the feedback winding 20 and the series resistor 31. Thus current $I_3$ flows through resistor 15, current $I_4$ flows through resistor 16 and feedback winding 20, and the sum of these two currents, or $I_0$, flows through resistor 31 back to the output terminal 28.

Connected across the feedback winding 20 is a resistor 32 which serves only to increase the time constant of the feedback circuit and thereby smooth out the discrete pulses of feedback current signal. The resistance of the resistor 32 is relatively high compared to that of the feedback winding 20 so that the current flow relationships just described are not significantly affected by the resistor 32.

The direction of flow of the current $I_4$ in the feedback winding 20 is such that for an increase in $I_4$, the output current $I_0$ decreases and for a decrease in $I_4$, the output current $I_0$ increases. The feedback of an output signal around an amplifier back to the input in a subtractive sense in this manner is commonly known as negative feedback. In other words, the current $I_4$ is fed back around the magnetic amplifier 14 through a negative feedback loop whereby the signal produced by the current $I_4$ in the feedback winding 20 subtracts from that produced by the input current I flowing in the signal winding 19.

The effect of the foregoing arrangement is to greatly reduce the effect on the magnitude of the current $I_4$ of changes in the resistance values $R_3$ and $R_4$. By way of example, assume that the resistance levels $R_3$ and $R_4$ are adjusted in such a manner as to cause the current $I_4$ to tend to increase. The increase in the current $I_4$ flowing in the feedback winding 20 produces a signal tending to decrease the output current $I_0$ and to substantially restore the current $I_4$ to its original magnitude. The higher the amplifier gain, the more pronounced this restoring effect becomes so that for a particular set of parameters, the amplifier gain can be selected such that the current $I_4$ changes by only a small percentage over a wide range of values of resistances $R_3$ and $R_4$. And, since the current $I_4$ is thus held substantially constant over the desired range of ratios of the two resistance values $R_3$ and $R_4$, the magnitude of the current $I_3$ is therefore substantially directly proportional to the resistance ratio $R_3/R_4$.

To give an example assume that the resistors 15 and 16 are connected directly to a current source of magnitude I as shown in FIG. 1 and that the initial values of $R_3$ and $R_4$ are each 10 ohms. The ratio of the two resistances is thus 1.0 and the current through each resistor is 0.5I. Now assume that $R_3$ is increased to 20 ohms making the ratio of $R_3/R_4$ assume a value of 2.0. At the same time, however, the change in the resistance $R_3$ has caused the current in $R_4$ to increase to 0.667I, an increase of approximately 33 percent. If the current $I_3$ is to represent the output of the system on a linear basis, an error of approximately 33% has thus been introduced. However, assuming the same initial values for the system shown in FIG. 3, and assuming for purposes of example an amplifier current gain of 100 together with a feedback gain of unity, the same change in the value of $R_3$ produces a change in $I_4$ of less than 0.5 percent. A higher amplifier current gain would result in an even smaller percentage change in $I_4$. Thus for the same set of initial resistance values and the same range of ratios, the system shown in FIG. 1 produces an error of approximately 33 percent while the system of FIG. 3, with a modest amplifier current gain of 100, produces an error of less than 0.5 percent.

The output of the system which is to be proportional to the current $I_3$ may be extracted in a number of different ways. In FIG. 3, I have shown two particular methods of obtaining such an output signal. One of these comprises a current sensing device 30 connected to respond directly to the magnitude of the current $I_3$. The output of the current sensing device 30 may be in the form of an indication on a current or a ratio calibrated dial or it may be in the form of an electrical signal proportional to the magnitude of the current $I_3$ and appearing at a pair of output terminals 33 and 34. It will be appreciated, of course, that the series resistance of the current sensing device 30 must be substantially less than the minimum value of $R_3$ to be accommodated in order to avoid any significant effect on the accuracy of the system.

A signal proportional to the magnitude of $I_3$ may also be obtained from the voltage drop across the series resistor 31. It will be appreciated that the magnetic amplifier 14 is a current amplifying device and that therefore neither the magnitude of the current output $I_0$ nor the current division characteristic between the parallel connected resistors 15 and 16 is affected by the provision of the series resistor 31 so long as the resistance value thereof is not made so large as to excessively load the amplifier. It will be appreciated that the magnitude of the current $I_0$ flowing in the resistor 31, and hence the voltage drop across it, is proportional to the sum of the currents $I_3$ and $I_4$. Since the current $I_4$ remains substantially constant, the voltage drop across resistor 31 produced by the current $I_4$ is also substantially constant. Thus, the total voltage drop across resistor 31 is made up of two superimposed voltages, one being substantially constant and determined by the magnitude of $I_4$ and the other being directly proportional to the variable current $I_3$. A voltage directly proportional to the magnitude of $I_3$ may therefore be obtained by balancing out in the signal detecting arrangement the constant voltage drop produced by the current $I_4$, leaving only the variable voltage produced by the current $I_3$. In order to accomplish this, I provide an adjustable voltage source 35 which may be adjusted to balance out the constant voltage drop produced across the resistor 31 by the current $I_4$, such that the voltage which appears at the output terminals 36 and 37 is directly proportional to the current $I_3$ and hence to the ratio $R_4/R_3$. Connected in series with the adjustable voltage source 35 is a resistor 38 which is relatively large in comparison to the resistance of the resistor 31 so that the output circuit of the amplifier is not significantly loaded by the output signal takeoff circuit.

Thus, it will be apparent from the foregoing that the arrangement of FIG. 3 provides a ratio computer in which an output current $I_3$ is directly proportional to the ratio $R_4/R_3$ of the two resistors 15 and 16 and to the input current I, which can be held substantially constant. The inputs to the computer, as has been indicated above, are introduced as the only values $R_3$ and $R_4$ of the resistors 15 and 16.

In FIG. 4, I have depicted the circuit diagram of FIG. 3 in block diagram form in which the various elements of the circuit are presented as transfer functions representing the mathematical relationships between the inputs to and the outputs from the respective elements. In each case the output of the element represented by the block is determined by multiplying the input to the element by the transfer function shown in the block.

The magnetic amplifier 14 is represented by the block 39 having a current gain G. The net input current to the magnetic amplifier is the difference between the source current I and the feedback current $I_4$ and the output current $I_0$ is determined by the product of the input and the current gain G. The current $I_4$ flowing in the resistor 16 is obtained by multiplying the amplifier output current $I_0$ by the transfer function $$\frac{R_3}{R_3+R_4}$$

and the output of the computer, which here is shown as the current $I_3$ but can, of course, be a signal proportional thereto, is obtained by multiplying the current $I_4$ by the resistance ratio $R_4$ over $R_3$ of the resistors 15 and 16.

It can be shown mathematically that so long as the product of the two transfer functions enclosed in the feedback loop that is, $$\frac{GR_3}{R_3+R_4}$$

remains substantially greater than unity over the range of values of the transfer function $$\frac{R_3}{R_3+R_4}$$

which is produced by the ranges of $R_3$ and $R_4$ to be accommodated, the current gain of the system between the input current I and the current $I_4$ will remain substantially at unity, being sensitive only to a relatively minor extent to the variations in the transfer function $$\frac{R_3}{R_3+R_4}$$

Over this range, therefore, the output current $I_3$ is proportional only to the resistance ratio $R_4/R_3$ and the magnitude of the input current I which is substantially constant. The foregoing condition can be satisfied by selecting the current gain G of the amplifier such that the product $$\frac{GR_3}{R_3+R_4}$$

remains substantially greater than unity over the range of values $$\frac{R_3}{R_3+R_4}$$

to be accommodated. If this condition is satisfied, then the relationship between the output current $I_3$ and the input current I becomes substantially:

$$I_3 = I\frac{R_4}{R_3}$$

Since the source current I is held constant, the relationship between the resistance ratio $R_4/R_3$ and the current $I_3$ is a substantially linear one within the limits set forth above.

Referring now to FIG. 5, I have illustrated an embodiment of my invention wherein the voltage division characteristics of a pair of series connected resistors are utilized. In this embodiment, I employ an A.-C. source of voltage 40 of magnitude E connected as shown to the grid of a vacuum tube 41. Connected in series between the plate and the cathode of the tube 40 are two adjustable resistors 42 and 43 having resistance values of magnitudes $R_3$ and $R_4$ respectively. The adjustable resistor 42 is connected in the cathode circuit of the vacuum tube 41 as shown in cathode follower form to achieve negative feedback around the amplifier. The two inputs to the system are introduced as the ohmic values $R_3$ and $R_3$ of the two resistors 42 and 43 and the output is represented by the magnitude $E_4$ of the A.-C. component of voltage appearing across the resistor 43.

It can be shown mathematically that the magnitude of the A.-C. component of voltage $E_3$ appearing across resistor 42 may be written in terms of the input voltage E, amplication factor $\mu$ and the plate resistance $r_p$ of the tube 41 as follows:

$$E_3 = \frac{\mu R_3}{(\mu+1)R_3+r_p+R_4}E$$

And since the same current flows through the two resistors 42 and 43, $$\frac{E_4}{R_4} = \frac{E_3}{R_3}$$

and $$E_4 = \frac{R_4}{R_3}E_3$$

which yields $$E_4 = E\frac{\mu R_4}{(\mu+1)R_3+r_p+R_4}$$

Where $(\mu+1)R_3$ is made very much larger than $r_p+R_4$, the above expression reduces to $$E_4 = \frac{\mu E}{\mu+1}\frac{R_4}{R_3}$$

Since $$\frac{\mu}{\mu+1}$$

is determined by the tube characteristics and remains substantially constant and since the magnitude E of the source voltage can be held substantially constant, the condition for linearity between the A.-C. component of voltage $E_4$ and the resistance ratio $R_4/R_3$ is therefore satisfield within the limits set forth. It will be appreciated that the output voltage $E_4$ represents only the A.-C. component of voltage appearing across the resistor 43 and that the D.-C. voltage relationships are not necessarily satisfied by the circuit illustrated in FIG. 5 within the assumptions made above. The A.-C. component of voltage $E_4$ may be extracted by means of a blocking capacitor 44 or by other means well known to those skilled in the art.

It will be appreciated that other types of voltage feedback arrangements may be utilized and that depending on the circuit employed the above relationships may be established for the D.-C. components of voltage appearing across the two series connected resistors with a direct current voltage source being employed.

Thus, it will be seen that my invention provides a ratio computer which utilizes the current or voltage division characteristics of a pair of resistors connected to either a voltage or a current source and which provides an output signal which occupies a substantially linear relationship to the ratio of the resistance values over a wide range of resistance levels. It will be appreciated that various types of feedback amplifiers may be used in practising my invention. I have shown two examples, one being a magnetic amplifier and the other a vacuum tube type but it will be appreciated from the presentation of my invention set forth herein that other types, such as transistor amplifiers, for example, may be employed. For obvious reasons, in the embodiment of my invention wherein the resistors are connected in parallel and the current division characteristic is to be used, I prefer to use an amplifier such as a magnetic amplifier which is fundamentally a current amplifying device and wherein the input and feedback parameters, which in this case are electrical currents, may be introduced directly to the amplifier input and utilized directly from the output, although it will be appreciated that a vacuum tube amplifier which is fundamentally a voltage sensitive device may be employed in such an application with some additional circuit provisions well known to those skilled in the art. Similarly, for the embodiment wherein the resistors are series connected and the voltage division characteristic is to be used, I generally prefer to employ a feedback amplifier which is fundamentally voltage sensitive in characteristic.

It will of course be realized that while my invention provides an arrangement which provides an output signal proportional to the ratio of a pair of resistance values, this characteristic may be used for other than ratio computing purposes. For example, in the embodiment of FIG. 5, if the magnitude of $R_4$ is made directly proportional to a first input signal and the magnitude of $R_3$ is made inversely proportional to a second input signal, the output signal is then directly proportional to the multiplicand of the two input signals, although it will be appreciated that in such a utilization the output of the system still represents the ratio of the resistance values of the two resistors. Various other utilizations will occur to those skilled in the art.

In addition, it should be recognized that other forms of electrical impedances, such as inductors or capacitors or various combinations of such elements may be substituted for or combined with the resistors in the circuitry which I have described. Although problems related to the phase shift produced by such elements would have to be considered along with possible problems relating to the change in impedance values with changes in frequency, the principles of my invention which I have set forth would nevertheless obviously apply to such systems. In other words, it is well known in the art that a fixed frequency inductors and capacitors behave the same as resistors in terms of the magnitude relationships of current and voltage. Thus, when I use the terms "resistance" or "resistor" I intend to include within the scope of these terms all forms of electrical impedances including those in which the exact form of the impedance may be complex or even non-linear, provided only that the characteristic produced upon series or parallel connections such as shown in FIGS. 1 and 2 provides an electrical parameter proportional to the ratio of the two impedance values.

Thus, it will be seen from the foregoing that various modifications, changes and substitutions may be made in the embodiments of my invention presented herein without departing from the true scope and spirit of my invention as defined in the appended claims.

What I claim as new and desire to secure by Letters Patent is:

1. A computer comprising first and second resistors connected in parallel with each other, means for producing an output signal proportional to the magnitude of the current flowing in said first resistor, and feedback amplifier means for automatically maintaining the current flowing in said second resistor substantially constant over a preselected range of resistance values of said resistors.

2. A computing device for generating an output signal as a function of a pair of input variables comprising first and second adjustable resistors connected in parallel with each other, means for adjusting the ohmic values of said resistors each as a function of one of said input variables, means for producing an output signal proportional to the magnitude of the current flowing in said first resistor, and feedback amplifier means connectible to a current source and responding to the magnitude of the current flowing in said second resistor to automatically maintain the current in said second resistor substantially constant over a preselected range of resistance values of said resistors.

3. A ratio computer comprising amplifier means connectible at the input thereof to a source of electric current, first and second electrical resistors connected in parallel with each other to the output of said amplifier means, means for producing an output signal proportional to the magnitude of the current flowing in said first resistor, and means for feeding back and subtracting from the input to said amplifier means a signal proportional to the magnitude of the current flowing in said second resistor, whereby said output signal is made substantially directly proportional to the ratio of the ohmic values of said resistors within a preselected range of resistance values of said resistors.

References Cited by the Examiner

UNITED STATES PATENTS 2,698,134  12/54  Agins _____ 235—193
2,987,255   6/61  Fogarty _____ 235—194

OTHER REFERENCES

Pages 10–12, 1952, Electronic Analog Computers, Korn and Korn.

MALCOLM A. MORRISON, *Primary Examiner.*

LEO SMILOW, WALTER W. BURNS, JR., *Examiners.*